United States Patent
Vincent et al.

(10) Patent No.: US 6,706,864 B1
(45) Date of Patent: Mar. 16, 2004

(54) WATER-INSOLUBLE VIOLET BENZIMIDAZOLONE MONOAZO PIGMENTS

(75) Inventors: Mark J. Vincent, Mississauga (CA); Helen Skelton, Mississauga (CA); Jaroslav Slupecky, Toronto (CA); Justin Yee, Mississauga (CA)

(73) Assignee: Dominion Colour Corporation, Toronto (CA)

( * ) Notice: Subject to any disclaimer, the term of this patent is extended or adjusted under 35 U.S.C. 154(b) by 9 days.

(21) Appl. No.: 10/368,586

(22) Filed: Feb. 20, 2003

(51) Int. Cl.$^7$ .................. C09B 29/036; C09B 29/20
(52) U.S. Cl. ....................... 534/774; 106/496
(58) Field of Search .................. 106/496; 534/774

(56) References Cited

U.S. PATENT DOCUMENTS

| 3,118,870 A | | 1/1964 | Dietz et al. | 534/801 |
|---|---|---|---|---|
| 3,137,686 A | * | 6/1964 | Dietz et al. | 534/801 |
| 3,609,135 A | | 9/1971 | Ribka | 534/575 |
| 4,312,807 A | | 1/1982 | Fuchs | 534/740 |
| 4,555,568 A | * | 11/1985 | Hunger | 534/801 |

FOREIGN PATENT DOCUMENTS

| DE | 1188229 | | 3/1960 |
|---|---|---|---|
| DE | 1215839 | | 4/1961 |
| DE | 300028 | * | 5/1992 |
| GB | 1238896 | | 7/1971 |
| GB | 2015015 | | 9/1979 |

OTHER PUBLICATIONS

Kleine et al., Chemical Abstracts, 117:253360, 1992.*

* cited by examiner

Primary Examiner—Fiona T. Powers
(74) Attorney, Agent, or Firm—Robert F. Delbridge

(57) ABSTRACT

Water-insoluble violet benzimidazolone monoazo pigments of the formula:

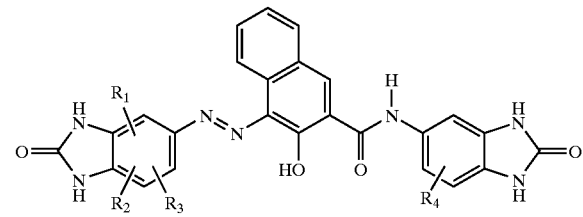

wherein $R_1$, $R_2$ and $R_3$ each represent hydrogen, chlorine, bromine, methyl, methoxy, ethoxy, nitro or a group of the formula —COOR with R being hydrogen, methyl or ethyl, and $R_4$ represents hydrogen, chlorine, bromine, methyl, methoxy, ethoxy or nitro group. Due to the presence of two 5-membered heterocyclic rings in the molecule, these pigments display very high thermoresistance and excellent fastness to migration.

4 Claims, No Drawings

WATER-INSOLUBLE VIOLET BENZIMIDAZOLONE MONOAZO PIGMENTS

FIELD OF INVENTION

This invention relates to water-insoluble violet benzimidazolone monoazo pigments and processes for their preparation.

BACKGROUND OF INVENTION

A number of water-insoluble violet benzimidazolone monoazo pigments are known, for example as described in U.S. Pat. No. 3,118,870 (Dietz et al.), U.S. Pat. No. 3,137,686 (Dietz et al.), U.S. Pat. No. 3,609,135 (Ribka), U.S. Pat. No. 4,312,807 (Fuchs), U.S. Pat. No. 4,555,568 (Hunger), DE Patent No.1,188,229, DE Patent No.1,215,839, UK Patent No.1,238,896 and UK Patent No.2,015,015.

It is an object of the invention to provide water-insoluble violet benzimidazolone monoazo pigments which display high thermo resistance and good fastness to migration.

SUMMARY OF INVENTION

According to the invention, water-insoluble violet benzimidazolone monoazo pigments have two benzimidazolone rings in the pigment molecule and the following general formula:

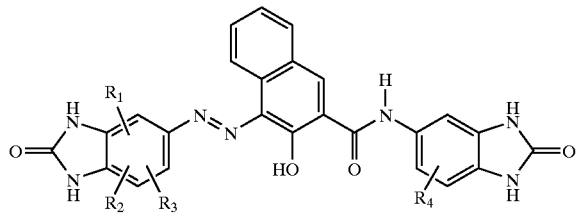

wherein $R_1$, $R_2$ and $R_3$ each represent hydrogen, chlorine, bromine, methyl, methoxy, ethoxy, nitro or a group of the formula —COOR with R being hydrogen, methyl or ethyl, and $R_4$ represents hydrogen, chlorine, bromine, methyl, methoxy, ethoxy or nitro group.

$R_1$ may be methyl and $R_2$, $R_3$ and $R_4$ may be hydrogen. Alternatively, $R_1$, $R_2$, $R_3$ and $R_4$ may each be hydrogen.

A monoazo pigment in accordance with the invention may be prepared by coupling the diazonium salt of an amine of the formula:

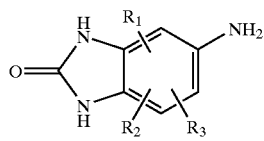

wherein $R_1$, $R_2$, and $R_3$ are as defined above, with a compound of the formula:

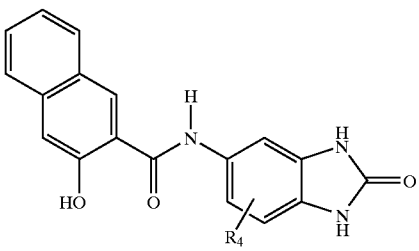

wherein $R_4$ is as defined above.

DESCRIPTION OF PREFERRED EMBODIMENTS

Diazonium salts of the following amines may be used for coupling:

5-amino-benzimidazolone-(2)
5-amino-6-methyl-benzimidazolone-(2)
5-amino-6-methoxy-benzimidazolone-(2)
5-amino-6-ethoxy-benzimidazolone-(2)
5-amino-4-chloro-benzimidazolone-(2)
5-amino-6-chloro-benzimidazolone-(2)
5-amino-7-chloro-benzimidazolone-(2)
5-amino-7-methyl-benzimidazolone-(2)
5-amino-7-methoxy-benzimidazolone-(2)
5-amino-7-ethoxy-benzimidazolone-(2)
5-amino-4,6-dichloro-benzimidazolone-(2)
5-amino-4,6,7-trichloro-benzimidazolone-(2)
5-amino-6-nitro-benzimidazolone-(2)
5-amino-benzimidazolone-6-carboxylic acid
5-amino-benzimidazolone-6-carboxylic acid methyl ester
5-amino-benzimidazolone-6-carboxylic acid ethyl ester The coupling component used in the present invention for the preparation of the monoazo pigments can be prepared by known methods, for example by reacting 2-hydroxy-3-naphtoic acid chloride with 5-amino-benzimidazolone-(2). There may be also be used the corresponding derivatives substituted in the benzene nucleus of the benzimidazolone radical, as for example:

5-(2'-hydroxy-3'-naphtoylamino)-6-chloro-benzimidazolone-(2)
5-(2'-hydroxy-3'-naphtoylamino)-7-chloro-benzimidazolone-(2)
5-(2'-hydroxy-3'-naphtoylamino)-6-methyl-benzimidazolone-(2)
5-(2'-hydroxy-3'-naphtoylamino)-7-methyl-benzimidazolone-(2)
5-(2'-hydroxy-3'-naphtoylamino)-7-ethoxy-benzimidazolone-(2)
5-(2'-hydroxy-3'-naphtoylamino)-7-bromo-benzimidazolone-(2)
5-(2'-hydroxy-3'-naphtoylamino)-6-methoxy-benzimidazolone-(2).

Diazotisation may be performed by known methods.

Coupling may be carried out by gradual addition of the acid solution of the diazonium salt to the aqueous suspension of reprecipitated coupling component in a slightly acidic medium, preferably at a pH of 4 to 6.

Coupling can be also carried out by simultaneous addition of the aqueous alkaline solution of the coupling component and the acetic solution of the diazo salt into a buffer. Suitable buffers are for example the alkali salts of formic acid, phosphoric acid or especially acetic acid.

Coupling is performed advantageously in the presence of agents promoting coupling. Those which may be mentioned are in particular nonionic, cationic or anionic dispersing agents, for example arylalkylsulfonates, such as dodecylbenzenesulfonate, alkylbenzenesulfonates, alkylnaphthalenesulfonates, fatty acids, for example palmitic acid, stearic acid and oleic acid, alkali metal salts of fatty acids, naphthenic acids and resin acids, cationic substances, such as quaternary ammonium salts, N-oxides of tertiary amines or their salts, fatty amines and their ethoxylated derivatives, and nonionic substances such as fatty alcohol polyglycol ethers and polycondensation products of ethylene or propylene oxides.

The surface-active agents can be added either alone or as a mixture. The amount can vary within wide limits, the quantity which is generally used being 0.1 to 20% by weight, preferably 2 to 10% by weight, relative to a 100% pigment yield.

The coupling component solution can also contain protective colloids, for example methyl cellulose, or small amounts of inert organic compounds, sparingly soluble or insoluble in water, for example aromatic hydrocarbons, such as toluene, xylene. chlorobenzene, or nitrobenzene, as well as aliphatic halogenated hydrocarbons, for example carbon tetrachloride, also organic solvents miscible with water, such as acetone, methyl ethyl ketone, methanol, ethanol or isopropanol, or preferably dimethylformamide.

Some of the pigments obtained by this invention possess a hard grain. In order to obtain the full tinctorial strength they may be heated in the form of their reaction mixture under pressure to temperatures above 100° C. using a closed pressure vessel. Alternatively, the crude pigment can be first isolated, washed free of salt and subsequently heat-treated in an aqueous or aqueous-solvent containing suspension at temperatures above 100° C., preferably 120° C. to 180° C.

A further variant of the after treatment with solvents consists of stirring the moist filter cake with a suitable solvent, distilling off the water and heating the suspension free from water to a temperature above 100° C., removing the solvent by distillation or filtration and isolating the pigment.

Suitable solvents to be added to the suspension are for example toluene, xylene, chlorobenzene, o-dichlorobenzene, nitrobenzene, pyridine, quinoline, methanol, ethanol, isopropanol, n-butanol, isobutanol, glycol monomethyl ether, glycol monoethyl ether, acetone, methylethyl ketone, dimethylformamide, dimethylsulfoxide, dimethylacetamide, N-methylpyrrolidone and tetramethylene sulfone.

Finally, coupling can also be carried out by suspending the amine and the coupling component in a molar ratio of 1:1 in an organic solvent and treating the suspension with a diazotising agent, especially an ester of nitric acid, such as methyl nitrite, ethyl nitrite, butyl nitrite or amyl nitrite.

The products according to the present invention are valuable pigments which can be used in all pigment application fields. They are particularly interesting for coloring high-molecular weight materials because of their excellent fastness to migration. Because they contain two 5-membered heterocyclic rings in the molecule, they display high thermoresistance. The pigments can be used in the coloration of plastics, coatings and inks.

DESCRIPTION OF EXAMPLES

The following examples illustrate the invention. Percentages are by weight.

Example 1

8.1 g of 5-amino-6-methylbenzimidazolone-(2) was stirred with 250 ml of water and 14.5 ml of 31.5% hydrochloric acid for 1 hour and then diazotized at 0° C. after the addition of ice, by adding an aqueous sodium nitrite solution.

In a second vessel 16.0 g of 5-(2'-hydroxy-3'-naphtoylamino)-benzimidazolone-(2) was suspended in 250 ml of water and dissolved by addition of 60 ml of 10% sodium hydroxide solution. After the addition of 14 parts by volume of a 10% aqueous solution of the reaction product of 1 mol of stearyl alcohol and 20 mol of ethylene oxide, the coupling component was precipitated with 72 ml of 15% acetic acid.

The diazonium salt solution was then added dropwise within 1 hour at 55–60° C. to this suspension with simultaneous addition of 10% soda ash solution in such manner that the pH 5.0–5.5 was maintained during the coupling reaction.

Coupling being complete, the batch was heated for 1 hour at 95–98° C., then the crude pigment formed was filtered off in a hot state and washed with hot water.

168.0 g of a press cake of a violet pigment were obtained.

In order to change pigment properties, the press cake was stirred with 120 ml of water and 260 ml of isobutanol. This mixture was transferred into a pressure vessel and heated while being agitated for 3 hours at 125° C. After cooling below the boiling point, the isobutanol was distilled off by steam, the pigment was filtered off, washed with hot water, dried at 80° C. and ground.

20.7 g of the violet pigment of the formula:

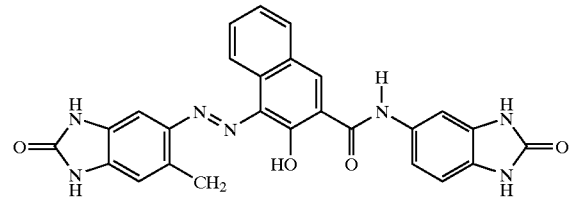

having very good fastness to solvent and migration and good fastness to light was obtained.

Example 2

8.1 g of 5-amino-6-methylbenzimidazolone-(2) was diazotized with sodium nitrite solution in the same method as described in Example 1.

16.0 g of 5-(2'-hydroxy-3'-naphtoylamnio)-benzimidazolone-(2) was dissolved in 250 ml of water and 60 ml of 10% sodium hydroxide solution. This solution was added simultaneously with the diazo solution within 1 hour into a vigorously stirred buffer solution consisting of 350 ml of water, 20.4 g of sodium acetate, 7.0 ml of 20% acetic acid and 14 ml of 10% aqueous solution of the emulsifier described in Example 1. During the addition the pH was maintained at 5.2–5.5 and temperature was 55–60° C. The coupling was complete immediately after the addition of the components. The mixture was then heated for 1 hour at 95–98° C. The pigment was filtered and washed with hot water.

The press cake was stirred with 450 ml of water and heated for 3 hours at 140° C. in a pressure vessel. After cooling, the pigment was filtered off, washed with hot water, dried at 80° C. and ground. 20.4 g of the violet pigment having similar properties as the pigment described before were obtained.

Example 3

8.0 g of 5-amino-benzimidazolone-(2) was diazotized with sodium nitrite solution and then coupling and pressure treatment were carried out in the same method as described in Example 2.

20.5 g of the violet pigment of the formula:

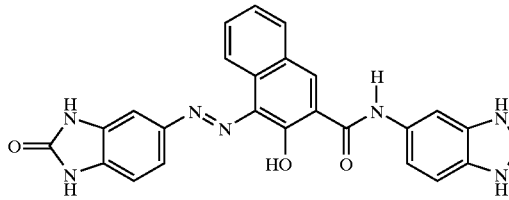

having similar properties as the pigment described before were obtained.

It has been found that the present invention enables water-insoluble benzimidazolone monoazo pigments to be produced which have a much bluer shade violet color than there is which can be produced by the prior art mentioned earlier which produces pigments with a Bordeaux or red shade violet color.

Other embodiments and examples of the invention will now be readily apparent to a person skilled in the art, the scope of the invention being defined in the appended claims.

What is claimed is:

1. A water-insoluble violet benzimidazolone monoazo pigment of the formula:

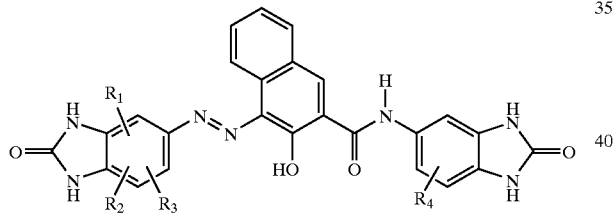

wherein $P_1$, $R_2$ and $R_3$ each represent hydrogen, chlorine, bromine, methyl, methoxy, ethoxy or a group of the formula —COOR with R being hydrogen, methyl or ethyl, and $R_4$ represents hydrogen, chlorine, bromine, methyl, methoxy or ethoxy group.

2. A monoazo pigment according to claim 1 of the formula:

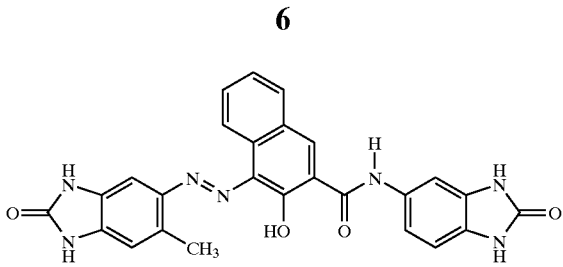

$R_1$ being methyl and $R_2$, $R_3$ and $R_4$ each being hydrogen.

3. A monoazo pigment according to claim 1 of the formula:

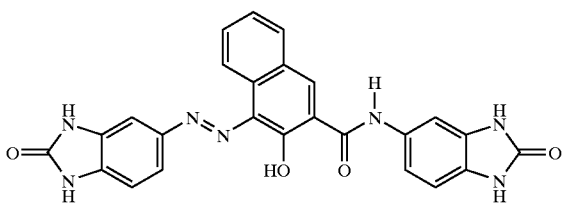

$R_1$, $R_2$, $R_3$ and $R_4$ each being hydrogen.

4. A process for preparing water-insoluble violet benzimidazolone monoazo pigments of the formula according to claim 1 comprising coupling the diazonium salt of an amine of the formula:

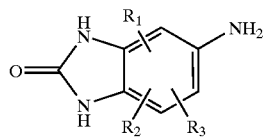

wherein $R_1$, $R_2$, and $R_3$ are as defined in claim 1, with a compound of the formula:

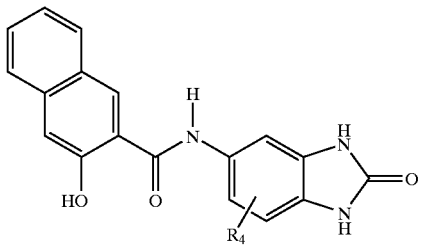

wherein $R_4$ is as defined in claim 1.

* * * * *